United States Patent Office
2,776,191
Patented Jan. 1, 1957

2,776,191

PROCESS FOR THE PRODUCTION OF MAGNESIUM OXIDE FROM ORES CONTAINING MAGNESIUM SULFATE

Gunter H. Gloss, Libertyville, Ill., assignor to International Minerals & Chemical Corporation, a corporation of New York No Drawing. Application December 31, 1953,
Serial No. 401,729

12 Claims. (Cl. 23—201)

The instant application is a continuation-in-part of application Serial No. 377,971, filed September 1, 1953, now abandoned.

The instant invention relates to processes for the reduction of magnesium sulfate in salts or ores containing it. More particularly, it relates to catalyzed processes for the selective reduction of magnesium sulfate in ores or salts containing it.

Magnesium sulfate occurs by itself in ores and salts, such as kieserite ($MgSO_4.H_2O$) or epsomite $$(MgSO_4.7H_2O)$$

in combination with potassium sulfate in ores and salts, such as langbeinite ($K_2SO_4.2MgSO_4$), leonite $$(MgSO_4.K_2SO_4.4H_2O)$$

and schoenite ($K_2SO_4.MgSO_4.6H_2O$), and with sulfates of potassium and calcium in ores, such as polyhalite ($K_2SO_4.MgSO_4.2CaSO_4.2H_2O$).

The most abundant of these ores occurring naturally are langbeinite and polyhalite, which occur in the Carlsbad, New Mexico, area. Various processes for the recovery of potassium values from ores containing sulfates of magnesium and of potassium are known. For example, in a typical process, langbeinite ore is leached with water which results in the formation of schoenite and/or leonite, depending upon the concentration and temperature of the solution. A number of methods are known for breaking down schoenite and leonite. In one process, finely divided coal is admixed with schoenite and the mixture is subjected to the action of superheated steam. In another process, schoenite and coal are heated together and react approximately according to the following equation:

$$2K_2Mg(SO_4)_2 + C = 2K_2SO_4 + MgO + CO_2 + 2SO_2$$

In these processes the reaction is carried out in equipment which is internally heated and in which the reducing conditions are created by the use of excess fuel, such as coal or carbon. Under these conditions the sulfur is not readily recoverable because it is evolved primarily in the form of sulfur dioxide diluted by combustion gases, and the residue in the furnace contains a mixture of sulfides, sulfites and carbonates along with potassium sulfate and magnesium oxide. In other words, the reactions involved are complex and cannot be controlled so as to selectively reduce one component without decomposing the other.

When reduction of ores containing sulfates, such as langbeinite or polyhalite, is carried out, for example as described and claimed in U. S. Patent No. 1,975,798, issued to Partridge et al., the ore is heated at a temperature between about 800° C. and about 900° C. in the presence of natural gas and water vapor. Difficulties arise in practicing this process because the reaction temperature is within a range in which thermal efficiency in externally heated equipment, such as a roasting furnace, is low and the cost of maintenance is high, because of excessive deterioration of the structural parts of the furnace. When lower temperatures than about 800° C. are employed, the reduction proceeds too slowly to be of any practicality. The final product of the reaction is a crude potassium sulfide, which must be processed for conversion to potassium sulfate or other usable potassium salts. In this process the reaction cannot be controlled so that other components of the ore, such as magnesium oxide and sulfur can be recovered. This process is commercially unattractive for the recovery of the potash values alone, because of the relatively low potassium oxide content of the ore, which generally runs between about 10% and about 15%. In addition, the sodium chloride, which is generally present in langbeinite and polyhalite ores, fuses at temperatures above about 800° C. and interferes with the reducing action and results in incomplete separation of the components.

It is an object of the instant invention to provide improved processes for the recovery of potassium and magnesium components from ores containing their sulfate salts.

It is a further object of the instant invention to provide improved processes for the reduction of magnesium sulfate.

It is a further object of the instant invention to provide improved processes for the selective reduction of magnesium sulfate in ores containing the sulfates of magnesium, of potassium, and/or of calcium.

It is a further object of the instant invention to provide commercially feasible processes for the production of potassium sulfate, magnesium oxide, and sulfur from ores containing sulfates of magnesium and of potassium, such as langbeinite ore.

It is a further object of the instant invention to provide commercially feasible processes for the production of high grade potassium sulfate, magnesium oxide, and sulfur from ores containing the sulfates of magnesium, potassium, and calcium, such as polyhalite.

These and other objects of the instant invention will become more apparent upon a fuller understanding of the invention as hereinafter described.

It has been discovered that magnesium sulfate present in an ore or a salt containing it, such as epsomite, or in ore or salt containing it in combination with potassium sulfate and/or calcium sulfate, such as langbeinite or polyhalite, is reduced by natural gas, for example a hydrocarbon gas containing large amounts of methane, at a temperature between about 700° C. and about 775° C. when the reaction is carried out in the presence of a small amount of carbonaceous material as the catalyst. It has been found that the potassium, magnesium and sulfur values present in the ore which has been subjected to the reduction can be recovered as high grade products.

In one embodiment of the instant invention, langbeinite is reduced in a reaction which proceeds approximately according to the following equation:

$$K_2SO_4.2MgSO_4 + 2CH_4 = K_2SO_4 + 2S + 2MgO + 2CO + 4H_2O$$

However, this equation or theory of the reaction is not to be understood as a limitation of the instant novel process.

The natural gas employed as the reducing agent is a straight chain gaseous alkane composition, such as compositions of one or more of the following: methane, ethane, propane, n-butane and isobutane. The catalytic material employed is a carbonaceous material. By the term "carbonaceous material" as used in the description and claims is meant a carbon-containing material, such as coal, carbon, coke, charcoal, bone black or lampblack, and materials which form carbon under the reaction conditions obtaining, such as sawdust, pitch, sugars, peat, asphalt, lignin, and the like. The carbonaceous material may be mixed with the salt or ore containing magnesium sulfate prior to the reaction or it may be admitted simultaneously with the salt or ore into the reaction chamber. The carbonaceous material is a solid material which may have varying particle sizes; however, it is preferable that the material is finely divided and intimately mixed with the ore.

In one embodiment of the instant invention, magnesium oxide, potassium sulfate, and sulfur are produced from langbeinite by selective reduction of the magnesium sulfate in the ore with natural gas. Substantially complete reduction of the magnesium sulfate to magnesium oxide is effected at a temperature as low as about 700° C. by adding between about 1% and about 5% by weight of carbonaceous material to the ore. Although an amount within the above range is sufficient to catalyze the reaction at this temperature, a larger amount of carbonaceous material may be employed without adversely effecting the reaction. Carbonaceous material is admixed with the langbeinite, and the mixture heated to between about 700° C. and about 775° C. In this temperature range externally heated furnaces operate much more efficiently and at much lower cost than they do at a temperature above about 800° C. or 825° C. A temperature of about 850° C. would be necessary in order to obtain the same degree of reduction if the catalyst is not admixed with the salt or ore to be reduced. When the reduction is carried out at a temperature between about 700° C. and about 775° C., the residual sodium chloride impurities which are present in langbeinite ore do not interfere with the reduction to the same extent as when a temperature above 800° C. is employed. When a temperature above 800° C. is employed, sodium chloride present in the ore fuses and hinders the reduction.

The magnesium sulfate present in the langbeinite is selectively reduced to magnesium oxide. The residue in the furnace contains potassium sulfate along with the magnesium oxide. A small portion of the potassium sulfate is reduced to potassium sulfide and potassium sulfite. In order to eliminate these undesirable components from the finished product, the hot residue from the reducing furnace is contacted with the atmosphere, for example in a rotating drum or a kiln, at a temperature between about 600° C. and about 700° C. This contact with air at an elevated temperature for between about 5 minutes and about 30 minutes serves to burn out previously added, but unburned, carbonaceous material, while at the same time re-oxidizing the reduced portions of the potassium component. After this treatment the potassium sulfate and magnesium oxide are separated by any conventional method, for example hot water is added to the mixture to dissolve selectively the potassium sulfate. Generally, the water employed has a temperature between about 80° C. and about 100° C., and the residue from the reduction is added hot so as to maintain a temperature close to boiling. The resulting potassium sulfate-containing solution is separated from the insoluble hydrated magnesium oxide, for example by filtration. The potassium sulfate solution is concentrated by evaporation and cooled to obtain a crystalline product containing at least about 95% potassium sulfate. Magnesium oxide is recalcined to remove water of hydration and residual carbonaceous impurities.

Between about 85% and about 90% of the sulfur present in the magnesium sulfate component of the langbeinite ore is recovered from the gas leaving the furnace in the form of elemental sulfur or as hydrogen sulfide or a mixture of both. The hydrogen sulfide is converted to elemental sulfur by any one of the numerous conventional methods known to the art, for example by the well-known Claus process, or one of its modifications. This and other methods for the conversion of hydrogen sulfide to sulfur are discussed in detail in the article "Sulfur from hydrogen sulfide," by B. W. Gamson and R. H. Elkins, Chemical Engineering Progress, 49, No. 4, pages 203–215 (1953).

In a more specific embodiment of the invention, langbeinite ore is pulverized, for example to pass an about 100 mesh size screen, and between about 1% and about 5% by weight of powdered bituminous coal is admixed with the ore which is then heated in a furnace. A Nicholas-Herreshoff furnace provided with Carborundum muffles is suitable for externally heating the ore to a temperature between about 700° C. and about 750° C., while methane gas is passed over the hearths countercurrently to the ore feed. The ratio of ore to methane employed is about 1 mole methane for each mole of magnesium sulfate in the ore. An excess of methane will result in formation of larger amounts of hydrogen sulfide while a deficiency will result in a higher magnesium sulfate content in the final product. The rate of flow of natural gas over the langbeinite depends upon the design of the particular furnace employed, the particle size of the ore, and the efficiency of contact of gas with the ore as well as other factors well known in the art. Sulfur is recovered from the gas leaving the furnace, for example by cooling the exit gas and collecting the sulfur which condenses from the gas in a suitable container or trap. If desired, water is also condensed from the exit gas leaving the furnace, and the gas from which the sulfur and water have been removed, and which contains mainly carbon monoxide and small amounts of carbonyl sulfide and hydrogen sulfide, is used as fuel for the furnace.

The instant process is conducted either batchwise or by a continuous process. Appropriate amounts of ore and carbonaceous material may be charged in a reaction vessel in which the mixture is heated, and gas is passed over the mixture until the magnesium sulfate has been substantially completely reduced. Alternately, the ore and the reducing gas are continuously passed countercurrently into a suitable reactor, such as a Nicholas-Herreshoff furnace.

In another embodiment of the instant invention, an ore or salt containing magnesium sulfate, such as epsomite, polyhalite, or kieserite, is heated to a temperature between about 700° C. and about 775° C. in the presence of a small amount of carbonaceous material. A flow of natural gas is passed through the ore. The residue in the furnace is magnesium oxide. A pure white product containing at least 98% magnesium oxide is obtained by recalcining the furnace residue.

The instant invention is applicable to salts and ores of magnesium sulfate, such as kieserite and epsomite and to salts and ores containing magnesium sulfate in combination with sulfates of potassium and/or calcium, such as langbeinite, leonite, schoenite and polyhalite.

Polyhalite is reduced according to the instant process. The crude polyhalite is crushed and washed with water to remove sodium chloride. Between about 1% and about 5% of carbonaceous material, preferably between about 1% and about 2% by weight of coal is admixed with the polyhalite, which is then partially reduced in a furnace with a natural gas, such as methane at a temperature between about 750° C. and about 775° C. Under these conditions, the retenion time of the feed in the furnace is between about 1 hour and about 2 hours. The magnesium sulfate present in the polyhalite is reduced to magnesium oxide, and approximately half of the calcium sulfate is reduced to calcium sulfide. Sulfur and hydrogen sulfide are recovered from the exit gas from the furnace as described above. The residue in the furnace comprises magnesium oxide, calcium sulfate, calcium sulfide, and potassium sulfate.

One of the most difficult problems in the recovery of potash values from polyhalite is the separation of calcium sulfate and potassium sulfate because of the formation of stable double compounds, such as syngenite, which are formed by these two components in the aqueous system over a wide range of conditions. In the practice of the instant invention, the reduction of the ore is carried to a point where all of the magnesium sulfate is reduced to magnesium oxide and at least half of the calcium sulfate to calcium sulfide, while the potassium sulfate is substantially unchanged. This partially reduced residue is then mixed with hot water, preferably at a temperature between about 80° C. and about 100° C., and subjected to a carbonating treatment, for example with carbon dioxide or boiler flue gas. In this carbonation the following reaction is believed to take place:

$$MgO + CaS + CaSO_4 + CO_2 + H_2O \rightarrow MgSO_4 + 2CaCO_3 + H_2S$$

The potassium sulfate does not participate in the reaction and remains in the aqueous phase. The hydrogen sulfide is released in the vapor phase and is converted to sulfur by conventional means described above. The carbonated slurry contains potassium sulfate and magnesium sulfate in the liquid phase and calcium carbonate as a solid phase. Calcium carbonate is separated from the solution, for example by filtration, while, if desired, the calcium carbonate filter cake is dried and used as a filler in various commercial applications. The filtrate containing magnesium sulfate and potassium sulfate is evaporated to dryness and subjected to a secondary reduction in the manner described above for langbeinite. Magnesium oxide and potassium sulfate are the products of this secondary reduction and are separated from the mixture in the same manner as the langbeinite reduction products.

The process thus affords a simple means for separating polyhalite into the components magnesium oxide, potassium sulfate, sulfur and calcium carbonate, all of which have commercial value.

The following examples are presented in order to afford a clearer understanding of the practice of the instant invention, but it is distinctly understood that these examples are illustrative only and there is no intention to limit the invention thereto.

*Example I*

About 35 grams of pulverized langbeinite ore was mixed with about nine-tenths of a gram of powdered coal. The langbeinite had approximately the following analysis:

|  | Percent |
|---|---|
| Potassium sulfate | 42.25 |
| Magnesium sulfate | 57.21 |
| Sodium chloride | .54 |

This mixture was placed in a tube which was heated to about 750° C. Natural gas was passed through the tube at a rate of about 0.38 cubic foot per hour for a period of about sixty minutes. The temperature was held between about 745° C. and about 755° C. during this period. Exit gas leaving the tube contained elemental sulfur, hydrogen sulfide and small amounts of other materials. The residue in the tube was exposed to the atmosphere for about fifteen minutes, while at a temperature of about 600° C., and then it was leached with about 50 milliliters of water, having a temperature of about 95° C. The resulting solution containing potassium sulfate was separated from the solid magnesium oxide by filtration. The magnesium oxide was calcined, and 6.3 grams of product containing about 97.5% oxide was obtained. This corresponds to a yield of about 94% magnesium oxide. The potassium sulfate-containing solution was evaporated until a crystalline product containing 14.5 grams potassium sulfate of 96.9% purity was obtained. This corresponds to a 96.2% yield of potassium sulfate.

*Example II*

About 50 grams of pulverized washed polyhalite ore was admixed with about 2 grams of powdered coal. The composition of the polyhalite was:

|  | Percent |
|---|---|
| Potassium sulfate | 24.4 |
| Magnesium sulfate | 20.1 |
| Calcium sulfate | 49.6 |
| Sodium chloride | 0.6 |

This mixture was placed in a tube which was heated to between about 750° C. and about 775° C., and natural gas was passed through the tube at a rate of about 0.9 cubic foot per hour for a period of about one hundred minutes. Exit gas leaving the tube contained elemental sulfur, hydrogen sulfide and small amounts of other materials. The residue in the tube weighing about 36.6 grams, was suspended in about 400 milliliters of hot water at a temperature of about 95° C., and immediately carbonated with carbon dioxide. After approximately four hours of carbonation, all of the remaining calcium sulfate had been converted to calcium carbonate, and solids were separated from the slurry by filtration. The dried filter cake weighed about 24.1 grams and contained calcium carbonate with minor impurities from the insoluble contaminants initially present in the polyhalite and coal. The filtrate contained approximately about 11.8 grams potassium sulfate and about 9.9 grams magnesium sulfate. After evaporation of the filtrates to dryness, the resulting material was again reduced as described in Example I, and yielded about 11.4 grams of potassium sulfate and about 3.4 grams of magnesium oxide as final products.

Having thus fully described and illustrated the character of the instant invention, what is desired to be protected by Letters Patent is:

1. A process for the production of magnesium oxide from compositions containing magnesium sulfate and selected from the group consisting of a double sulfate salt of magnesium and potassium and mixtures containing magnesium sulfate and potassium sulfate which comprises reacting said compositions in the presence of a solid carbonaceous material catalyst with a gaseous alkane at a temperature between about 700° C. and about 775° C., exposing the reaction products to the atmosphere at a temperature beween about 600° C. and about 700° C. until any reduced portions of the potassium component have been substantially completely oxidized and separately recovering potassium sulfate and magnesium oxide from the resultant reacted mixture.

2. A process as in claim 1 wherein the second heating step conducted under exposure to the atmosphere is carried out for between about 5 and about 30 minutes.

3. A process as in claim 1 wherein the potassium sulfate is separated from the magnesium oxide by water leaching.

4. A process as in claim 1 wherein the composition being reacted is a triple sulfate salt of magnesium, potassium, and calcium and wherein said composition is subjected to a preliminary treatment with a gaseous alkane in the presence of a solid carbonaceous material catalyst at a temperature between about 700° C. and about 775° C., mixing the reaction products with hot water, carbonating the resulting aqueous suspension with a carbon dioxide-containing gas, separating solid calcium carbonate from the resulting solution, and evaporating said solution to dryness to obtain the mixture of magnesium sulfate and potassium sulfate.

5. A process for the reduction of magnesium sulfate to magnesium oxide which comprises reacting a double sulfate salt of magnesium and potassium in the presence of a solid carbonaceous material catalyst with a gaseous alkane at a temperature between about 700° C. and about 775° C., exposing the reaction products to the atmosphere at a temperature between about 600° C. and about 700° C. until any reduced portions of the potassium component have been substantially completely oxidized, admixing the reaction products with hot water, and separating the resulting solution containing potassium sulfate from the solid hydrated magnesium oxide.

6. A process for the reduction of magnesium sulfate to magnesium oxide which comprises reacting a double sulfate salt of magnesium and potassium in the presence of a solid carbonaceous material catalyst with methane at a temperature between about 700° C. and about 775° C., exposing the reaction products to the atmosphere at a temperature between about 600° C. and about 700° C. for between about 15 minutes and about 30 minutes, admixing the reaction products with hot water, and separating the resulting solution containing potassium sulfate from solid hydrated magnesium oxide.

7. A process for the reduction of langbeinite to produce magnesium oxide, potassium sulfate and elemental sulfur which comprises contacting langbeinite in the presence of between about 1% and about 5% by weight of solid carbonaceous material catalyst with a gaseous alkane at a temperature between about 700° C. and about 775° C., exposing the reaction products to the atmosphere at a temperature between about 600° C. and about 700° C. for between about 5 and about 30 minutes, leaching potassium sulfate from the solid reaction products with hot water, and separating the resulting potassium sulfate-containing solution from solid hydrated magnesium oxide.

8. A process for the reduction langbeinite to produce magnesium oxide, potassium sulfate and elemental sulfur which comprises containing langbeinite containing between about 1% and about 5% by weight of solid carbonaceous material catalyst with a gaseous alkane at a temperature between about 700° C. and about 775° C., exposing the reaction products to the atmosphere at a temperature between about 600° C. and about 700° C. for between about 15 minutes and about 30 minutes, leaching potassium sulfate from the solid reaction products with water having a temperature between about 80° C. and about 100° C., and separating the resulting potassium sulfate solution from solid hydrated magnesium oxide.

9. A process for the reduction of langbeinite to produce magnesium oxide, potassium sulfate and elemental sulfur which comprises contacting langbeinite containing between about 1% and about 5% by weight of coal with methane at a temperature between about 700° C. and about 775° C., exposing the reaction products to the atmosphere at a temperature between about 600° C. and about 700° C. for between about 15 minutes and about 30 minutes, leaching potassium sulfate from solid reaction products with water having a temperature between about 80° C. and about 100° C., and separating the resulting potassium sulfate solution from solid hydrated magnesium oxide.

10. A process for the reduction of a triple sulfate salt of magnesium, potassium and calcium to produce magnesium oxide, potassium sulfate and elemental sulfur which comprises reacting a triple sulfate salt of magnesium, potassium and calcium in the presence of a solid carbonaceous catalyst material with a gaseous alkane at a temperature between about 700° C. and about 775° C., mixing the reaction products with hot water, carbonating the resulting aqueous suspension, separating solid calcium carbonate from the resulting solution, evaporating said solution to dryness to obtain a mixture of magnesium sulfate and potassium sulfate, contacting said mixture in the presence of a carbonaceous material with a gaseous alkane at a temperature between about 700° C. and about 775° C., exposing the reaction products to the atmosphere at a temperature between about 600° C. and about 700° C. for between about 5 and about 30 minutes, adding hot water to the resulting reaction products, and separating solid hydrated magnesium oxide from the solution containing potassium sulfate.

11. A process for the reduction of polyhalite to produce magnesium oxide, potassium sulfate and elemental sulfur which comprises contacting polyhalite in the presence of between about 1% and about 5% by weight of solid carbonaceous material catalyst with methane at a temperature between about 700° C. and about 775° C., mixing the reaction products with hot water, carbonating the resulting aqueous suspension, separating solid calcium carbonate from the resulting solution, evaporating said solution to dryness to obtain a mixture of magnesium sulfate and potassium sulfate, contacting said mixture in the presence of between about 1% and about 5% of a carbonaceous material with a gaseous alkane at a temperature between about 700° C. and about 775° C., exposing the reaction products to the atmosphere at a temperature between about 600° C. and about 700° C. for between about 5 and about 30 minutes, adding hot water to the resulting reaction products, and separating solid hydrated magnesium oxide from the solution containing potassium sulfate.

12. A process for the reduction of polyhalite to produce magnesium oxide, potassium sulfate and elemental sulfur which comprises contacting polyhalite containing between about 1% and about 5% by weight of coal with methane at a temperature between about 750° C. and about 775° C., mixing the reaction products with hot water, carbonating the resulting aqueous suspension, separating solid calcium carbonate from the resulting solution, evaporating said solution to dryness to obtain a mixture of magnesium sulfate and potassium sulfate, contacting said mixture in the presence of coal with methane at a temperature between about 700° C. and about 775° C., exposing the reaction products to the atmosphere at a temperature between about 600° C. and about 700° C. for between about 5 and about 30 minutes, adding hot water to the resulting reaction products, and separating solid hydrated magnesium oxide from the solution containing potassium sulfate.

References Cited in the file of this patent

UNITED STATES PATENTS

| | | |
|---|---|---|
| 1,975,789 | Partridge | Oct. 9, 1934 |
| 2,171,966 | Zirngibl et al. | Sept. 5, 1939 |
| 2,230,592 | Griesbach et al. | Feb. 4, 1941 |

FOREIGN PATENTS

| | | |
|---|---|---|
| 31,148 | Germany | Mar. 20, 1885 |
| 598,254 | Germany | June 7, 1934 |
| 826,938 | France | Jan. 18, 1938 |

OTHER REFERENCES

Chem. Abs. 32, 7373 (1938).
Chem. Abs. 33, 9560 (1939).